UNITED STATES PATENT OFFICE 3,810,835
Patented May 14, 1974

3,810,835
PROCESS FOR TREATING OIL SLICKS USING
CHEMICAL AGENTS
Richard L. Ferm, Lafayette, Calif., assignor to Chevron
Research Company, San Francisco, Calif.
No Drawing. Filed Feb. 25, 1971, Ser. No. 119,036
Int. Cl. C02b 9/02
U.S. Cl. 210—59          8 Claims

ABSTRACT OF THE DISCLOSURE

A process for treating an oil slick to contain it and prevent its uncontrolled spreading comprising applying to open water areas in the vicinity of the oil spill a chemical agent which repulses the oil spill. By judicious application of the chemical agent, the oil slick can be gathered into a limited area which facilitates cleanup. The chemical agent is selected from the group consisting of (1) N,N-dialkyl amides; (2) n-alkyl and n-alkylene monoethers of (a) ethylene glycol and (b) polyethylene glycol, (3) polyethylene glycol monoesters of n-alkyl acids; and (4) n-alkyl and n-alkylene monoesters of propylene glycol.

BACKGROUND OF THE INVENTION

A problem of increasing concern in the world today is the ever-growing threat from oil tanker spillage, offshore well leaks, and the like. The Torrey Canyon incident off the coast of England in 1967 wreaked havoc with England's seashore. The losses ran into the millions of dollars. The oil well leak in the Santa Barbara channel also resulted in losses directly and indirectly running into the millions of dollars.

The last few years have seen the mounting of a large effort to develop new methods and techniques for dealing with oil slicks arising from innumerable spillages, not all of the magnitude of those cited. The success of the techniques developed have been limited. This invention is concerned with a method for controlling oil spills to assist in their cleanup.

SUMMARY OF THE INVENTION

A process for treating oil slicks is disclosed whereby a chemical agent is applied to open water areas in the vicinity of the oil spill. The chemical agent repulses the oil spill. By judicious application of the chemical agent, the oil slick can be gathered or compressed into a limited area which facilitates cleanup. The chemical agents may be selected from the class of N,N-dialkyl amides; polyalkylene glycol monoesters of n-alkyl acids; and n-alkyl and n-alkylene monoethers of (1) ethylene glycol and (2) polyethylene glycol.

DETAILED DESCRIPTION OF THE INVENTION

The subject invention provides a process for preventing the uncontrolled spreading of oil slicks on fresh or salt water.

A chemical agent is applied to open water areas in the vicinity of the slick. By judicious application of the chemical agent which repulses the oil, the oil slick can be gathered into a limited area which facilitates cleanup.

By "judicious application" is meant that the chemical agent is applied in such a manner as to compress or gather the oil into a limited area. It is preferred to completely surround the slick with the chemical agent thereby compressing the oil slick into a limited area, preventing its spread. However, if this is physically impossible due to the size of the oil slick or prohibitively expensive, the chemical agent can be applied to the side of the oil slick which is threatening valuable property. In other words, an ocean beach can be protected by applying the chemical agent to the open-water area between the oil slick and the beach. Similarly, oyster beds can be protected by applying the chemical agent in such a manner as to repulse the oil slick from the area of the beds.

The oil slicks can be treated in their natural state or after some initial treatment has been carried out, such as coagulation by sulfur as taught in my copending application Ser. No. 119,037 filed the same date as this application titled "Process for Treating Oil Slicks Using Sulfur" and which is incorporated herein by reference. Further, the term oil slick is meant to include crude oil as recovered as well as diesel fuels, bunker fuel and other more highly refined petroleum products.

Chemical agents

The chemical agents which find use in this invention fall into three groups of oil film compression agents.

The first of these is the N,N-dialkyl amides of the formula

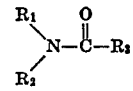

wherein $R_1$ is $CH_3$ or $C_2H_5$, $R_2$ is $CH_3$ or $C_2H_5$, and $R_3$ is n-alkyl or n-alkenyl of from 11–21 carbon atoms when $R_3$ is saturated, preferably from 11–17 carbon atoms, and $R_3$ is of from 14–19, preferably 17 carbon atoms, when $R_3$ is unsaturated. The preferred n-alkenyl radical is preferably derived from oleic acid.

The second group of compounds is the monoethers of ethylene glycol and polyethylene glycol of the formula:

$$HOCH_2(CH_2OCH_2)_nCH_2OR$$

wherein R is n-alkyl or n-alkenyl of from 12–22 carbon atoms and $n$ is a whole number from 0–9 and with the proviso that when R has from 18–22 carbon atoms, $n=0–9$, when R has from 14–17 carbon atoms, $n=0–5$, and when R has 12 or 13 carbon atoms, $n=0–3$. The preferred unsaturated aliphatic carbon radical when R has 18 carbon atoms is the radical derived from oleic acid.

The third group of compounds is the polyethylene glycol monoesters of n-alkyl acids.

The polyethylene glycol monoesters have the formula:

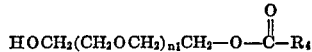

wherein $R_4$ is n-alkyl of from 11–21 carbon atoms, and $n_1$ is a whole number of from 0–5.

The fourth group of compounds are the propylene glycol monoesters of the formula

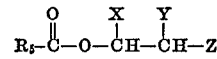

wherein $R_5$ is n-alkyl or n-alkenyl of 17 carbon atoms, i.e., the acid moiety is derived from stearic or oleic acid, X is hydrogen or methyl, Y is hydrogen, methyl or hydroxyl and Z is $CH_2OH$, methyl or hydrogen with the proviso that

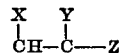

contains three carbon atoms and one hydroxyl group.

It should be noted that compatible mixtures of the chemical compression agents described above are contemplated as a part of this invention, particularly, but not limited to, mixtures within each of the groups described.

Solvents

When the chemical compression agent is a solid, a suitable solvent is used. A wide range of solvents are satisfactory. The only criteria for their selection is that the chemical compression agent be soluble to the desired level in the solvent. A viscosity suitable for spraying, and a fair degree of solubility in water are desirable. The rapidity with which the solvent containing the chemical compression agent spreads will vary depending on the particular combination being employed.

A preferred solvent is 2-butoxyethanol. Other solvents which are suitable include diethyl ether, isopropanol, ethanol, n-butylacetate, n-butyl alcohol and ethylene glycol-n-hexyl monoether.

The solvents may also be used with chemical compression agents which are liquids at the temperatures encountered in the cleanup process. The solvent acts as a diluent to spread the compression agent over a larger area more quickly and to speed formation of the mono-molecular layer. For this reason, less of the chemical compression agent is generally needed when a solvent is utilized.

Rate of application

On a calm water surface, oil-repelling agents theoretically need be applied only in amounts required to form a mono-molecular film on the water surface. On an absolutely calm water surface, one pound of molecular film-forming agent will cover about 50 to 100 acres. However, because of wave action, additional amounts will be needed under actual conditions. About 1 to 10, preferably from 2 to 5 gallons, of film-forming agent will be required per mile of perimeter of the oil spill area. The rates of application set forth above are the most suitable rates. However, the use of the chemical agents described herein in any amounts are helpful. The invention, then, is not limited in its scope to the rates of application set forth above, but is intended to include the broad concept of treating oil spills with the chemical agents described wherein an "effective" amount of the agent is used. That is, any amount which serves to contain or compress the oil slick.

The following examples are offered by way of illustration and not by way of limitation. All parts are by weight unless otherwise specified.

All the following examples were conducted by weighing about 0.5 g. Arabian light crude oil having an API gravity of 34.3 onto 600 ml. fresh water contained in standard 800-ml. beaker having a diameter of 9.3 centimeters. The oil spill compression agent was then added in an amount of about 0.02 g. if a liquid (or if a solid, about 0.04 g. of a 5 percent solution in 2-butoxyethanol is used) to a clear water area. After initial observation of oil compression effect, the water surface was agitated with a spatula to simulate wave action. Oil covered about 95 percent of the surface before the agent was added in each case.

TABLE 1.—OIL SPILL COMPRESSION AGENTS

| Agent | Speed of oil compression and area covered by oil before agitation | Results of agitation |
|---|---|---|
| Mixture of N,N-dimethyl caprylamide and N,N-dimethyl capramide, 50 and 40 percent respectively, 5 percent N,N-dimethyl lauramide, and 5 percent N,N-dimethyl caproamide Hallcomid M-8-10, product of C. P. Hall Co., liquid. | In 10 seconds to 5 percent of water surface | Many small droplets scattered over surface; within 5 minutes these spread to cover about 90 percent of surface. |
| N,N-dimethyl lauramide Hallcomid M-12, liquid. | Within 1 second to about 2 percent of surface | Very little effect, oil remained compressed in a few droplets on side of beaker. |
| N,N-dimethyl stearamide Hallcomid M-18, waxy solid. | Within 2 seconds to about 3 percent of surface | Small droplets were scattered on surface. These recombined in about 3 minutes to form several large drops on side of beaker, leaving water surface essentially oil-free. |
| N,N-dimethyl oleamide Hallcomid M-18-OL, liquid. | About 20 seconds to compress oil to cover 10 percent of area. | Many small droplets scattered over water surface. These slowly recombined to form a few large drops on beaker side, leaving water clear. |

TABLE 2.—OIL SPILL COMPRESSION AGENTS

| Agent | Speed of oil compression and area covered by oil before agitation | Results of agitation |
|---|---|---|
| Polyoxyethylene (4 units) lauryl ether, liquid, BRIJ 30 SP, Atlas Chemical. | 5 percent of area covered by oil film after 10 seconds. | Many small droplets scattered over surface covering 5 to 10 percent. |
| Polyoxyethylene (2 units) oleyl ether, liquid, BRIJ 93, Atlas Chemical. | Within 5 seconds compressed to 5 percent of area. | Many small droplets scattered over surface, covering about 10 percent. |
| Polyoxyethylene (10 units) oleyl ether, liquid, BRIJ 96, Atlas Chemical. | Within 30 seconds compressed to 5 percent of area. | Many small droplets covering about 15 percent of surface; 1 minute after agitation stopped. These coalesced on side of beaker leaving water surface essentially oil-free. |
| Polyoxyethylene (10 units) stearyl ether, waxy solid, BRIJ 76, Atlas Chemical. | Within 10 seconds compressed to 5 percent of area. | Re-spread to cover 40 percent of area. |
| Polyoxyethylene (2 units) stearyl ether, solid, BRIJ 72, Atlas Chemical. | Within 5 seconds compressed to 5 percent of area. | Small droplets dispersed over 5 percent of surface. |
| Ethylene glycol mono-1-docosanol ether, solid. | Within 10 seconds compressed to 5 percent of area. | Do. |

TABLE 3.—OIL SPILL COMPRESSION AGENTS

| Agent | Speed of oil compression and area covered by oil before agitation | Results of agitation |
|---|---|---|
| Ethylene glycol monostearate (Kessco brand product), solid. | Within 5 seconds to 5 percent of area | Re-spread to cover 15 percent of surface. |
| Diethylene glycol monostearate (Kessco brand product), solid. | do | Do. |
| Polyethylene glycol (8 units) monostearate (MYRJ 45, Atlas Chemical) solid. | do | Re-spread to cover 40 percent of surface. |
| Propylene glycol monostearate (Emerest 2381, Emery Industries) solid. | do | Small droplets scattered over about 10 percent of surface. |
| Glycerol monostearate (Arlacel 165, Atlas Chemical), solid. | Oil film rapidly compressed to 5 percent | Re-spread to cover 40 percent of surface. |
| Diethylene glycol monolaurate (Kessco brand product), liquid. | Within 5 seconds to 5 percent of area | A few medium sized particles covered about 5 percent of surface. |
| Polyethylene glycol (average of 4.5 units) monolaurate (Kessco brand product), liquid. | Within 5 seconds to 3 percent of area | A few medium-sized droplets covered about 5 percent of surface. |
| Polyethylene glycol (5 units) monococonate (Ethofat C/15, Atlas Chemical) liquid. | Rapid compression to less than 5 percent of surface. | Re-spread to cover 20 percent of surface. |
| Polyethylene glycol (9 units) monolaurate (Kessco brand product). | Within 1 minute to 20 percent of surface | Many small particles covering about 15 percent of surface. |
| Polyethylene glycol (average of 13.5 units) monolaurate (Kessco product) liquid. | Within 1 minute to 40 percent of surface | Re-spread to cover 90 percent of surface. |
| Polyethylene glycol (average of 4.5 units) monooleate (Kessco product) liquid. | Within 20 seconds to 5 percent of surface | Many small droplets covering about 5 percent of surface about 30 seconds after agitation was stopped. These recombined to a mass on side of beaker leaving water surface oil-free. |
| Polyethylene glycol (average of 13.5 units) monooleate (Kessco brand product) liquid. | Within 30 seconds to 20 percent of surface | Many small droplets covering about 20 percent of surface. |

I claim:

1. A process for controlling the spreading of an oil slick on fresh or salt water comprising applying to at least a portion of the perimeter of said oil slick an effective amount of a chemical agent consisting essentially of monoethers of the formula $$HOCH_2(CH_2OCH_2)_nCH_2OR$$

wherein R is n-alkyl or n-alkenyl of from 12–22 carbon atoms and n is a whole number of from 0–9, with the provisos that when R has from 18–22 carbon atoms, n is a whole number of from 0–9, when R has from 14–17 carbon atoms, n is a whole number of from 0–5, and when R has 12 or 13 carbon atoms, n is a whole number of from 0–3.

2. The process of claim 1 wherein said chemical agent is the monoether of the formula $$HOCH_2(CH_2OCH_2)_nCH_2OR$$

wherein R has from 18–22 carbon atoms.

3. The process of claim 1 wherein said chemical agent is a monoether of the formula:

$$HOCH_2(CH_2OCH_2)_nCH_2OR$$

wherein R is n-alkyl of from 14–17 carbon atoms and n has a value of from 0–5.

4. The process of claim 1 wherein said chemical agent is a monoether of the formula:

$$HOCH_2(CH_2OCH_2)_nCH_2OR$$

wherein R is n-alkyl of from 12 to 13 carbon atoms and n has a value of from 0–3.

5. The process of claim 4 wherein R is n-alkyl of 12 carbon atoms and n has a value of 3.

6. The process of claim 2 wherein R is n-alkenyl of 18 carbon atoms derived from oleic acid and n has a value of 1.

7. The process of claim 2 wherein R is n-alkyl of 18 carbon atoms and n has a value of 1.

8. The process of claim 2 wherein R is n-alkyl of 22 carbon atoms and n has a value of 0.

References Cited

UNITED STATES PATENTS

| | | | |
|---|---|---|---|
| 2,447,551 | 8/1948 | Zisman et al. | 210—DIG 21 |
| 2,965,678 | 12/1960 | Sundberg et al. | 252—DIG 1 |

OTHER REFERENCES

Naval Research Laboratory Report No. P–1930, W. A. Zisman, September 1942, unclassified December 1951.

Naval Research Laboratory Report No. P–1984, W. A. Zisman, January 1943, unclassified May 1958.

Fine, Richard D., "Nonionic Surfactants," Soap & Chemical Specialties, September 1957, pp. 50–53.

SAMIH N. ZAHARNA, Primary Examiner

T. G. WYSE, Assistant Examiner

U.S. Cl. X.R.

210—DIG 21; 252—312